United States Patent
Miller

(10) Patent No.: US 12,458,692 B2
(45) Date of Patent: Nov. 4, 2025

(54) SELF-ASSEMBLING PEPTIDE SCAFFOLD

(71) Applicant: Hexamer Therapeutics, Inc., Pullman, WA (US)

(72) Inventor: Keith Douglas Miller, Moscow, ID (US)

(73) Assignee: Hexamer Therapeutics, Inc., WA (US)

( * ) Notice: Subject to any disclaimer, the term of this patent is extended or adjusted under 35 U.S.C. 154(b) by 1043 days.

(21) Appl. No.: 17/258,297

(22) PCT Filed: Jul. 12, 2019

(86) PCT No.: PCT/US2019/041601
§ 371 (c)(1),
(2) Date: Jan. 6, 2021

(87) PCT Pub. No.: WO2020/014609
PCT Pub. Date: Jan. 16, 2020

(65) Prior Publication Data
US 2021/0268105 A1    Sep. 2, 2021

Related U.S. Application Data

(60) Provisional application No. 62/697,132, filed on Jul. 12, 2018.

(51) Int. Cl.
*A61K 47/64*    (2017.01)
*A61K 39/385*   (2006.01)
(Continued)

(52) U.S. Cl.
CPC .............. *A61K 39/385* (2013.01); *C07K 7/08* (2013.01); *C07K 14/001* (2013.01); *A61K 2039/6031* (2013.01); *A61K 2039/64* (2013.01)

(58) Field of Classification Search
CPC ................ C07K 7/08; C07K 14/001; C07K 2319/735; A61K 2039/6031; A61K 2039/64
See application file for complete search history.

(56) References Cited

U.S. PATENT DOCUMENTS

2010/0305304 A1   12/2010  Desmet
2016/0122783 A1    5/2016  Coffin

FOREIGN PATENT DOCUMENTS

CN         1414976 A       4/2003
KR    20140007428 A       1/2014
(Continued)

OTHER PUBLICATIONS

Isidro-Llobet, Albert, Mercedes Alvarez, and Fernando Albericio. "Amino acid-protecting groups." Chemical reviews 109.6 (2009): 2455-2504 (Year: 2009).*

(Continued)

*Primary Examiner* — Louise W Humphrey
*Assistant Examiner* — Mary A Crum
(74) *Attorney, Agent, or Firm* — Lee & Hayes, P.C.

(57) ABSTRACT

The present disclosure describes a peptide scaffold for producing vaccines. The peptide scaffold includes a peptide that self-assembles into a hapten carrier (hC) that includes amphipathic alpha-helices. The peptide includes heptad repeats following a specific pattern. The hC further includes hapten or an agent conjugated to it, and optionally the hC includes one or more T-cell epitopes at the N- and/or C-terminus of the one or more amphipathic alpha-helices. The present disclosure also describes compositions including immunogenic compositions including the hapten-hC or agent-hC conjugate.

23 Claims, 4 Drawing Sheets

Specification includes a Sequence Listing.

(51) Int. Cl.
  *C07K 7/08* (2006.01)
  *C07K 14/00* (2006.01)
  *A61K 39/00* (2006.01)

(56) References Cited

FOREIGN PATENT DOCUMENTS

| RU | 2141527 C1 | 11/1999 |
|---|---|---|
| WO | WO2007097923 A2 | 8/2007 |
| WO | WO2013009971 A1 | 1/2013 |
| WO | WO2013040142 A2 | 3/2013 |
| WO | WO2014126828 A1 | 8/2014 |
| WO | WO2015035475 A1 | 3/2015 |
| WO | WO2015164798 A1 | 10/2015 |
| WO | WO2018027252 A1 | 2/2018 |

OTHER PUBLICATIONS

Burgess, Natasha C., et al. "Modular design of self-assembling peptide-based nanotubes." Journal of the American Chemical Society 137.33 (2015): 10554-10562 (Year: 2015).*
Barnes, Michael R., and Ian C. Gray, eds. Bioinformatics for geneticists. John Wiley & Sons, 2003 (Year: 2003).*
Altschul et al., "Basic local alignment search tool," J. Mol. Biol., Oct. 1990. 215(3):403-410.
Australian Office Action mailed Oct. 14, 2022 for Australian Patent Application No. 2019300038, a foreign counterpart to U.S. Appl. No. 17/258,297, 11 pages.
Australian Office Action mailed Nov. 21, 2022 for Australian Patent Application No. 2019300038, a foreign counterpart to U.S. Appl. No. 17/258,297, 2 pages.
Australian Office Action mailed Jul. 8, 2022 for Australian Patent Application No. 2019300038, a foreign counterpart to U.S. Appl. No. 17/258,297, 4 pages.
Betakova et al., "Overview of measles and mumps vaccine: origin, present, and future of vaccine production," Acta Virologica, Jan. 2013. 57(2):91-96.
Bill, Roslyn, "Recombinant protein subunit vaccine synthesis in microbes: a role for yeast?," Journal of Pharmacy and Pharmacology, Oct. 2014. 67(3):319-328.
Brenner et al., "Assessing sequence comparison methods with reliable structurally identified distant evolutionary relationships," Proc. Natl. Acad. Sci., May 1998. 95(11):6073-6078.
Buckland, Barry, "The development and manufacture of influenza vaccines," Human Vaccines & Immunotherapeutics, Jun. 2015. 11(6):1357-1360.
Butler et al., "The choice of mammalian cell host and possibilities for glycosylation engineering," Current Opinion in Biotechnology, Dec. 2014. 30:107-1112.
Chou et al., "Removal of transmissible spongiform encephalopathy prion from large volumes of cell culture media supplemented with fetal bovine serum by using hollow fiber anion-exchange membrane chromatography," POOS One, Apr. 2015. 10(4):e0122300. 15 pages.
Ciabattini et al., "Heterologous prime-boost combinations highlight the crucial role of adjuvant in priming the immune system," Frontiers in Immunology, Mar. 2018. 9(380):1-13.
Clark et al., "Recombinant subunit vaccines: potentials and constraints," In: Midtlyng PJ (Ed.) Progress in Fish Vaccinology. Dev Biol. Basel, Karger, Jan. 2005. 121:153-163.
Corradin et al., "Long synthetic peptides for the production of vaccines and drugs: A technological platform coming of age," Science Translational Medicine, Sep. 2010. 2(50):50rv3. 8 pages.
Corradin et al., "Chapter 5—Malaria vaccine development using synthetic peptides as a technical platform," Advances In Immunology, Jan. 2012.114:107-149. Abstract.
Del Giudice et al., "Correlates of adjuvanticity: A review of adjuvants in licensed vaccines," Seminars in Immunology, May 2018. 39:14-21.
Extended European Search Report mailed Aug. 2, 2022 for European Patent Application No. 19834786.6, 13 pages.

Fiorucci et al., "Computational antigenic epitope prediction by calculating electrostatic desolvation penalties of protein surfaces," In: Rajat K. De and Namrata Tomar (Eds.) Immunoinformatics, Methods in Molecular Biology. Chapter 20, 2014. 1184:365-374.
Fiorucci et al., "Prediction of protein-protein interaction sites using electrostatic desolvation profiles, " Biophysical Journal, May 2010. 98(9):1921-1930.
Genzel, Yvonne, "Designing cell lines for viral vaccine production: Where do we stand?," Biotechnol. J., May 2015. 10(5):728-740.
Geysen et al., "Strategies for epitope analysis using peptide synthesis," Journal of Immunological Methods, Sep. 1987. 102(2):259-274. Abstract only.
Grein et al., "Virus separation using membranes," 2014. In: Portner (Eds.) Animal Cell Biotechnology. Methods in Molecular Biology. Human Press, Totowa, New Jersey, 2014. 1104:459-491. Abstract only.
Haste Andersen, et al., "Prediction of residues in discontinuous B-cell epitopes using protein 3D structures," Protein Science, Nov. 2006. 15(11):2558-2567.
Hermanson, "Chapter 2—Functional Targets for Bioconjugation" In: Greg T. Hermanson (ed.) Bioconjugate Techniques. Academic Press, London, UK, 2013. pp. 127-228.
Hu, Yu-chen, "Baculovirus as a highly efficient expression vector in insect and mammalian cells," Acta Pharamacologica Sinica, Apr. 2005. 26(4):405-416.
Hu et al., "Baculovirus as an expression and/or delivery vehicle for vaccine antigens," Expert Review of Vaccines, Apr. 2008. 7(3):363-371.
Jespersen et al., "BepiPred-2.0: Improving sequence-based B-cell epitope prediction using conformational epitopes," Nucleic Acids Research, May 2017. 45:W24-W29.
Josefsberg et al., "Vaccine process technology," Biotechnology and Bioengineering, Jun. 2012. 109(6):1443-1460.
Kawakami et al., "Regulatory expectations during product development for tumour vaccines," In Brown F. Petricciani J (Eds.) Development of Therapeutic Cancer Vaccines. Dev Biol. Basel, Karger. 2004.116:53-59.
Khan et al., "Shiga toxin producing Escherichia coli infection: Current progress & future challenges," Indian J Med Res, Jul. 2003. 118:1-24.
Kim et al., "Yeast as an expression system for producing virus-like particles: What factors do we need to consider?," Letters in Applied Microbiology, Feb. 2017. 64(2):111-123.
Kost et al., "Fundamentals of baculovirus expression and applications," In: M.C. Vega (Ed.) Advanced Technologies for Protein Complex Production and Characterization, Springer International Publishing, Swtizerland, 2016. 187-197.
Legastelois et al., "Non-conventional expression systems for the production of vaccine proteins and immunotherapeutic molecules," Human Vaccines & Immunotherapeutics, Dec. 2016. 13(4):947-961.
Merrifield, R. B., "Solid phase peptide sysnthesis—I. The synthesis of a tetrapeptide," Journal of the American Chemical Society, Jul. 1963. 85(14):2149-2154.
Miller et al., "Novel anti-nicotine vaccine using a trimeric coiled-coil hapten carrier," PLoS One, Dec. 2014. 9(12):e114366. 19 pages.
Miranda et al., "Accelerated chemical synthesis of peptides and small proteins," Proceedings of the National Academy of Sciences. Feb. 1999. 96(4):1181-1186.
Negahdaripour, "Harnessing self-assembled peptide nanoparticles in epitope vaccine design", Biotechnology Advances, May 2017. 35(5):575-596.
Nielsen, Jens, "Production of biopharmaceutical proteins by yeast," Bioengineered, Nov. 2012. 4(4):207-211.
Olugbile et al., "Malaria vaccines—The long synthetic peptide approach: Technical and conceptual advancements," Current Opinion in Molecular Therapeutics, Feb. 2010. 12(1): 64-76.
Pearson et al., "Improved tools for biological sequence comparison," Proc. Natl. Acad. Sci., Apr. 1988. 85(8):2444-2448.
Perez et al., "A new era in anticancer peptide vaccines," Cancer, May 2010. 116(9):2071-2080.

(56) References Cited

OTHER PUBLICATIONS

Persing et al., "Taking toll: Lipid A mimetics as adjuvants and immunomodulators," Trends in Microbiology, Oct. 2002. 10(10) Suppl.:S32-S37.
Pfarr et al., "Adjuvants for immunotherapy," Curr Opin Allergy Clin Immunol, Dec. 2012. 12(6):648-657.
Pietersz et al., "Design of peptide-based vaccines for cancer," Current Medicinal Chemistry, Jun. 2006. 13(14):1591-1607.
Ponomarenko et al., "ElliPro: A new structure-based tool for the prediction of antibody epitopes," BMC Bioinformatics, Dec. 2008. 9(1):1-8.
Rar et al., "Synthetic immunogenic complexes containing a peptide from the surface protein of the foot-and-mouth disease virus," Bioorganicheskaia Khimiia, Jul. 1990. 16(7):904-915. Abstract only.
Roohvand et al., "Biomedical applications of yeast- a patent view, part one: yeasts as workhorses for the production of therapeutics and vaccines," Expert Opinion of Therapeutic Patents, Jun. 2017. 27(8):929-951.
Rowland, et al. "Advancing TB vaccines to Phase I clinical trials in the US: regulatory/manufacturing/licensing issues," Tuberculosis, Jan. 2005. 85(1-2):39-46.
Russian Office Action mailed Dec. 12, 2022 for Russian Patent Application No. 2021103287, a foreign counterpart to U.S. Appl. No. 17/258,297, 20 pages.
Safdar et al., "Baculovirus-expressed influenza vaccine: A novel technology for safe and expeditious vaccine production for human use," Expert Opinion on Investigational Drugs, Jul. 2007. 16(7):927-934.
Sari et al., "The MultiBac baculovirus/insect cell expression vector system for producing complex protein biologics." In: M.C. Vega (Ed.) Advanced Technologies for Protein Complex Production and Characterization. Springer International Publishing, Swtizerland, 2016. pp. 199-215.
Russian Office Action mailed May 11, 2023 for Russian patent application No. 2021103287, a foreign counterpart of U.S. Appl. No. 17/258,297, 25 pages.
International Search Report and Written Opinion mailed Dec. 27, 2019 for PCT Application No. PCT/US2019/041601, 12 pages.
Australian Office Action mailed Dec. 24, 2021 for Australian Patent Application No. 2019300038, a foreign counterpart to U.S. Appl. No. 17/258,297, 10 pages.
Seydoux et al., "Effective combination adjuvants engage both TLR and inflammasome pathways to promote potent adaptive immune responses," J Immunol, May 2018. 201(1):98-112.
Singh et al., "Advances in vaccine adjuvants for infectious diseases," Current HIV Research, Jul. 2003. 1(3):309-320.
Smith et al., "Road from vaccines to therapies," Movement Disorders, Mar. 2004. 19(Suppl 8):S48-S52.
Tapia et al., "Efficient and stable production of Modified Vaccinia Ankara virus in two-stage semi-continuous and in continuous stirred tank cultivation systems," PLOS One, Aug. 2017. 12(8):e0182553. 17 pages.
Thomson et al., "Computational design of water-soluble alpha-helical barrels," Science, Oct. 2014. 346(6208):485-488.
Tribbick et al., "Similar binding properties of peptide ligands for a human immunoglobulin and its light chain dimer," Molecular Immunology, Jul. 1989. 26(7):625-635.
van Oers, Monique M., "Vaccines for viral and parasitic diseases produced with baculovirus vectors," Advances in Virus Research, 2006. 68:193-253.
Vlak et al., "Baculovirus expression vector system for production of viral vaccines," Advances in Biotechnological Processes, 1990. 14(14):91-128.
Warnock et al., "Bioreactor systems for the production of biopharmaceuticals from animal cells," J Biotechnol. Appl. Biochem., Jun. 2006. 45:1-12.
Wood et al., "ISAMBARD: an open-source computational environment for biomolecular analysis, modelling and design," Bioinformatics, Jun. 2017. 33(19):3043-3050.
Wood et al., "Tools for protein science: CCBuilder 2.0: Powerful and accessible coiled-coil modeling," Protein Science, Aug. 2017. 27:103-111.
Wu et al., "Alpha-Helical coiled-coil peptide materials for biomedical applications," WIREs Nanomed Nanobiotechnol, Mar./Apr. 2017. 9:e1424. 17 pages.
Yamada et al., "Next-generation peptide vaccines for advanced cancer," Cancer Science, Dec. 2012. 104(1):15-21.
Zaccai et al., "A de novo peptide hexamer with a mutable channel," Nature Chemical Biology, Oct. 2011. 7:935-941.
Chinese Office Action mailed Jul. 27, 2023 for Chinese Patent Application No. 201980046185.0, a foreign counterpart to U.S. Appl. No. 17/258,297, 12 pages.
Japanese Office Action mailed Apr. 24, 2023 for Japanese Patent Application No. 2021-523579, a foreign counterpart to U.S. Appl. No. 17/258,297, 14 pages.
Partial European Search Report and Written Opinion mailed Aug. 4, 2023 for European Patent Application No. 23159271.8, a foreign counterpart to U.S. Appl. No. 17/258,297, 15 pages.
Canadian Office Action mailed Aug. 25, 2023 for Canadian Patent Application No. 3,105,706, a foreign counterpart to U.S. Appl. No. 17/258,297, 5 pages.
Chinese Office Action mailed Feb. 1, 2024 for Chinese Application No. 201980046185.0, a foreign counterpart to U.S. Appl. No. 17/258,297, 6 pages.
Examination Report for Canadian Application No. 3,105,706, Dated Dec. 11, 2024, 4 pages.
Office Action for Korean Application No. 10-2021-7003917, Dated Jan. 14, 2025, 13 pages.
Office Action for Mexican Application No. MX/a/2021/000444, Dated Jul. 11, 2025, 20 pages.

\* cited by examiner

FIG. 2

SEQUENCE LISTING

```
<160> NUMBER OF SEQ ID NOS: 20

<210> SEQ ID NO 1
<211> LENGTH: 7
<212> TYPE: PRT
<213> ORGANISM: Artificial Sequence
<220> FEATURE:
<223> OTHER INFORMATION: heptad

<400> SEQUENCE: 1

Leu Arg Ser Ile Gly Lys Asp
1               5

<210> SEQ ID NO 2
<211> LENGTH: 7
<212> TYPE: PRT
<213> ORGANISM: Artificial Sequence
```

```
<220> FEATURE:
<223> OTHER INFORMATION: heptad

<400> SEQUENCE: 2

Leu Arg Ser Ile Gly Arg Asp
1               5

<210> SEQ ID NO 3
<211> LENGTH: 7
<212> TYPE: PRT
<213> ORGANISM: Artificial Sequence
<220> FEATURE:
<223> OTHER INFORMATION: heptad

<400> SEQUENCE: 3

Ile Arg Glu Ile Ser Arg Ala
1               5

<210> SEQ ID NO 4
<211> LENGTH: 7
<212> TYPE: PRT
<213> ORGANISM: Artificial Sequence
<220> FEATURE:
<223> OTHER INFORMATION: heptad

<400> SEQUENCE: 4

Ile Arg Glu Val Ala Gln Ser
1               5

<210> SEQ ID NO 5
<211> LENGTH: 7
<212> TYPE: PRT
<213> ORGANISM: Artificial Sequence
<220> FEATURE:
<223> OTHER INFORMATION: heptad

<400> SEQUENCE: 5

Ile Arg Asp Ile Ala Lys Ala
1               5

<210> SEQ ID NO 6
<211> LENGTH: 7
<212> TYPE: PRT
<213> ORGANISM: Artificial Sequence
<220> FEATURE:
<223> OTHER INFORMATION: heptad

<400> SEQUENCE: 6

Ile Arg Asp Ile Gly Arg Ala
1               5

<210> SEQ ID NO 7
<211> LENGTH: 7
<212> TYPE: PRT
<213> ORGANISM: Artificial Sequence
<220> FEATURE:
<223> OTHER INFORMATION: heptad

<400> SEQUENCE: 7

Ile Arg Asp Val Gly Gln Ser
1               5

<210> SEQ ID NO 8
<211> LENGTH: 7
<212> TYPE: PRT
<213> ORGANISM: Artificial Sequence
<220> FEATURE:
```

```
<223> OTHER INFORMATION: heptad

<400> SEQUENCE: 8

Ile Arg Asp Leu Ala Lys Gly
1               5

<210> SEQ ID NO 9
<211> LENGTH: 7
<212> TYPE: PRT
<213> ORGANISM: Artificial Sequence
<220> FEATURE:
<223> OTHER INFORMATION: heptad

<400> SEQUENCE: 9

Val Lys Asp Val Ala Arg Gly
1               5

<210> SEQ ID NO 10
<211> LENGTH: 7
<212> TYPE: PRT
<213> ORGANISM: Artificial Sequence
<220> FEATURE:
<223> OTHER INFORMATION: heptad

<400> SEQUENCE: 10

Ile Arg Asp Ile Gly Asn Ser
1               5

<210> SEQ ID NO 11
<211> LENGTH: 7
<212> TYPE: PRT
<213> ORGANISM: Artificial Sequence
<220> FEATURE:
<223> OTHER INFORMATION: heptad

<400> SEQUENCE: 11

Ile Lys Asp Leu Ala Arg Gly
1               5

<210> SEQ ID NO 12
<211> LENGTH: 7
<212> TYPE: PRT
<213> ORGANISM: Artificial Sequence
<220> FEATURE:
<223> OTHER INFORMATION: heptad

<400> SEQUENCE: 12

Ile Lys Lys Leu Lys Lys Lys
1               5

<210> SEQ ID NO 13
<211> LENGTH: 28
<212> TYPE: PRT
<213> ORGANISM: Artificial Sequence
<220> FEATURE:
<223> OTHER INFORMATION: hexamer

<400> SEQUENCE: 13

Leu Arg Ser Ile Gly Lys Asp Leu Arg Ser Ile Gly Lys Asp Leu Arg
1               5                   10                  15

Ser Ile Gly Lys Asp Leu Arg Ser Ile Gly Lys Asp
            20                  25

<210> SEQ ID NO 14
<211> LENGTH: 29
<212> TYPE: PRT
```

<213> ORGANISM: Artificial Sequence
<220> FEATURE:
<223> OTHER INFORMATION: hexamer

<400> SEQUENCE: 14

Leu Arg Ser Ile Gly Lys Asp Leu Arg Ser Ile Gly Lys Asp Leu Arg
1               5                   10                  15

Ser Ile Gly Lys Asp Leu Arg Ser Ile Gly Lys Asp Ser
            20                  25

<210> SEQ ID NO 15
<211> LENGTH: 28
<212> TYPE: PRT
<213> ORGANISM: Artificial Sequence
<220> FEATURE:
<223> OTHER INFORMATION: hexamer

<400> SEQUENCE: 15

Leu Arg Ser Ile Gly Lys Asp Leu Arg Ser Ile Gly Arg Asp Leu Arg
1               5                   10                  15

Ser Ile Gly Lys Asp Leu Arg Ser Ile Gly Arg Asp
            20                  25

<210> SEQ ID NO 16
<211> LENGTH: 28
<212> TYPE: PRT
<213> ORGANISM: Artificial Sequence
<220> FEATURE:
<223> OTHER INFORMATION: hexamer

<400> SEQUENCE: 16

Ile Arg Glu Ile Ser Arg Ala Ile Arg Glu Val Ala Gln Ser Ile Arg
1               5                   10                  15

Asp Ile Ala Lys Ala Ile Arg Glu Ile Gly Lys Ser
            20                  25

<210> SEQ ID NO 17
<211> LENGTH: 28
<212> TYPE: PRT
<213> ORGANISM: Artificial Sequence
<220> FEATURE:
<223> OTHER INFORMATION: hexamer

<400> SEQUENCE: 17

Ile Arg Asp Ile Gly Arg Ala Ile Arg Asp Val Gly Gln Ser Ile Arg
1               5                   10                  15

Asp Leu Ala Lys Gly Ile Arg Asp Ile Ser Lys Gly
            20                  25

<210> SEQ ID NO 18
<211> LENGTH: 28
<212> TYPE: PRT
<213> ORGANISM: Artificial Sequence
<220> FEATURE:
<223> OTHER INFORMATION: hexamer

<400> SEQUENCE: 18

Val Lys Asp Val Ala Arg Gly Ile Arg Asp Ile Gly Asn Ser Ile Lys
1               5                   10                  15

Asp Leu Ala Arg Gly Ile Arg Asp Ile Gly Arg Gly
            20                  25

```
<210> SEQ ID NO 19
<211> LENGTH: 7
<212> TYPE: PRT
<213> ORGANISM: Artificial Sequence
<220> FEATURE:
<223> OTHER INFORMATION: heptad pattern
<220> FEATURE:
<221> NAME/KEY: MISC_FEATURE
<222> LOCATION: (1)..(1)
<223> OTHER INFORMATION: Xaa is a hydrophobic or non-polar residue
<220> FEATURE:
<221> NAME/KEY: MISC_FEATURE
<222> LOCATION: (2)..(2)
<223> OTHER INFORMATION: Xaa is a positively charged, negatively
      charged, polar uncharged, or non-polar aliphatic residue
<220> FEATURE:
<221> NAME/KEY: MISC_FEATURE
<222> LOCATION: (3)..(3)
<223> OTHER INFORMATION: Xaa is a negatively charged, positively
      charged, non-polar aliphatic, or polar uncharged residue
<220> FEATURE:
<221> NAME/KEY: MISC_FEATURE
<222> LOCATION: (4)..(4)
<223> OTHER INFORMATION: Xaa is a hydrophobic or non-polar residue
<220> FEATURE:
<221> NAME/KEY: MISC_FEATURE
<222> LOCATION: (5)..(5)
<223> OTHER INFORMATION: Xaa is a negatively charged, positively
      charged, non-polar aliphatic, or polar uncharged residue
<220> FEATURE:
<221> NAME/KEY: MISC_FEATURE
<222> LOCATION: (6)..(6)
<223> OTHER INFORMATION: Xaa is any natural or non-natural residue for
      epitope coupling to a hapten or any other molecule
<220> FEATURE:
<221> NAME/KEY: MISC_FEATURE
<222> LOCATION: (7)..(7)
<223> OTHER INFORMATION: Xaa is a negatively charged, positively
      charged, polar uncharged, or non-polar aliphatic residue

<400> SEQUENCE: 19

Xaa Xaa Xaa Xaa Xaa Xaa Xaa
1               5

<210> SEQ ID NO 20
<211> LENGTH: 7
<212> TYPE: PRT
<213> ORGANISM: Artificial Sequence
<220> FEATURE:
<223> OTHER INFORMATION: peptide
<220> FEATURE:
<221> NAME/KEY: MISC_FEATURE
<222> LOCATION: (1)..(1)
<223> OTHER INFORMATION: Xaa is a hydrophobic or non-polar residue
<220> FEATURE:
<221> NAME/KEY: MISC_FEATURE
<222> LOCATION: (1)..(7)
<223> OTHER INFORMATION: The sequence as a whole repeats n times,
      wherein n is an integer greater than 1
<220> FEATURE:
<221> NAME/KEY: MISC_FEATURE
<222> LOCATION: (2)..(2)
<223> OTHER INFORMATION: Xaa is a positively charged, negatively
      charged, polar uncharged, or non-polar aliphatic residue
<220> FEATURE:
<221> NAME/KEY: MISC_FEATURE
<222> LOCATION: (3)..(3)
<223> OTHER INFORMATION: Xaa is a negatively charged, positively
      charged, non-polar aliphatic, or polar uncharged residue
<220> FEATURE:
<221> NAME/KEY: MISC_FEATURE
<222> LOCATION: (4)..(4)
<223> OTHER INFORMATION: Xaa is a hydrophobic or non-polar residue
<220> FEATURE:
<221> NAME/KEY: MISC_FEATURE
```

```
<222> LOCATION: (5)..(5)
<223> OTHER INFORMATION: Xaa is a negatively charged, positively
      charged, non-polar aliphatic, or polar uncharged residue
<220> FEATURE:
<221> NAME/KEY: MISC_FEATURE
<222> LOCATION: (6)..(6)
<223> OTHER INFORMATION: Xaa is any natural or non-natural residue for
      epitope coupling to a hapten or any other molecule
<220> FEATURE:
<221> NAME/KEY: MISC_FEATURE
<222> LOCATION: (7)..(7)
<223> OTHER INFORMATION: Xaa is a negatively charged, positively
      charged, polar uncharged, or non-polar aliphatic residue

<400> SEQUENCE: 20

Xaa Xaa Xaa Xaa Xaa Xaa Xaa
1               5
```

SELF-ASSEMBLING PEPTIDE SCAFFOLD

CROSS REFERENCE TO RELATED APPLICATIONS

This application is a U.S. National Phase Application of International Application No. PCT/US2019/041601 filed Jul. 12, 2019, which claims the benefit of U.S. Provisional Patent Application No. 62/697,132, filed on Jul. 12, 2018, all of which are hereby incorporated by reference in their entirety.

SEQUENCE LISTING INFORMATION

A computer readable textfile, entitled "A070-0003PCT_ST25.txt," created on or about Jul. 10, 2019, with a file size of about 7 KB, contains the sequence listing for this application and is hereby incorporated by reference in its entirety.

TECHNICAL FIELD

The present disclosure describes peptide scaffolds for producing vaccines synthetically.

BACKGROUND

Recombinant protein expression in hosts such as bacteria (predominantly *E. coli*), yeast, insect cells, and mammalian cells is currently the most common method of producing subunit vaccines. It has been very successful and will remain an important method of vaccine production. Typically, an infectious agent protein is identified by genomics analysis, functional assays, in silico analyses (e.g. functional prediction, structural analysis, epitope identification, etc.), or a combination of the three. Expression trials are initiated to assess yield and solubility for immunogenicity trials. Subunits producing high-titer antibodies to the disease target are then carried forward for protection studies where the vaccine is tested for its ability to protect hosts against infection and/or disease manifestation and progression. Subunits meeting all these criteria are then moved forward for vaccine production optimization, stability, and toxicity/safety/dosage studies. Expression optimization studies are also important to determine production scale and feasibility. It is well known that the entire process is time consuming, labor intensive, and very costly.

There is a need to develop a more efficient and cost-effective method for producing vaccines.

SUMMARY

The present disclosure describes monomer peptides comprising two or more heptads that self-assemble into a dimer, trimer, tetramer, pentamer, hexamer, heptamer, octamer, nanomer, or decamer. Each of the heptads comprises an amino acid sequence as set forth in SEQ ID NO: 1-11.

The peptides described herein self-assembles into a hapten carrier (hC). In embodiments, the peptides described herein self-assemble into hexamers and comprise an amino acid sequence as set forth in SEQ ID NO: 12-17. The Hexameric hapten carriers (HhC) further include one or more haptens conjugated to it. The HhC also includes T-cell epitopes at the N- and C-termini of hexameric helices.

In embodiments, the present disclosure describes compositions comprising the hapten carriers (hC) described herein containing one or more haptens and T-cell epitopes and a pharmaceutically acceptable excipient. The pharmaceutical composition is used to treat subjects in need of thereof.

In embodiments, the present disclosure describes methods of using the pharmaceutical composition described herein to induce a robust immune response in a subject in need thereof.

BRIEF DESCRIPTION OF THE DRAWINGS

Figure 2:
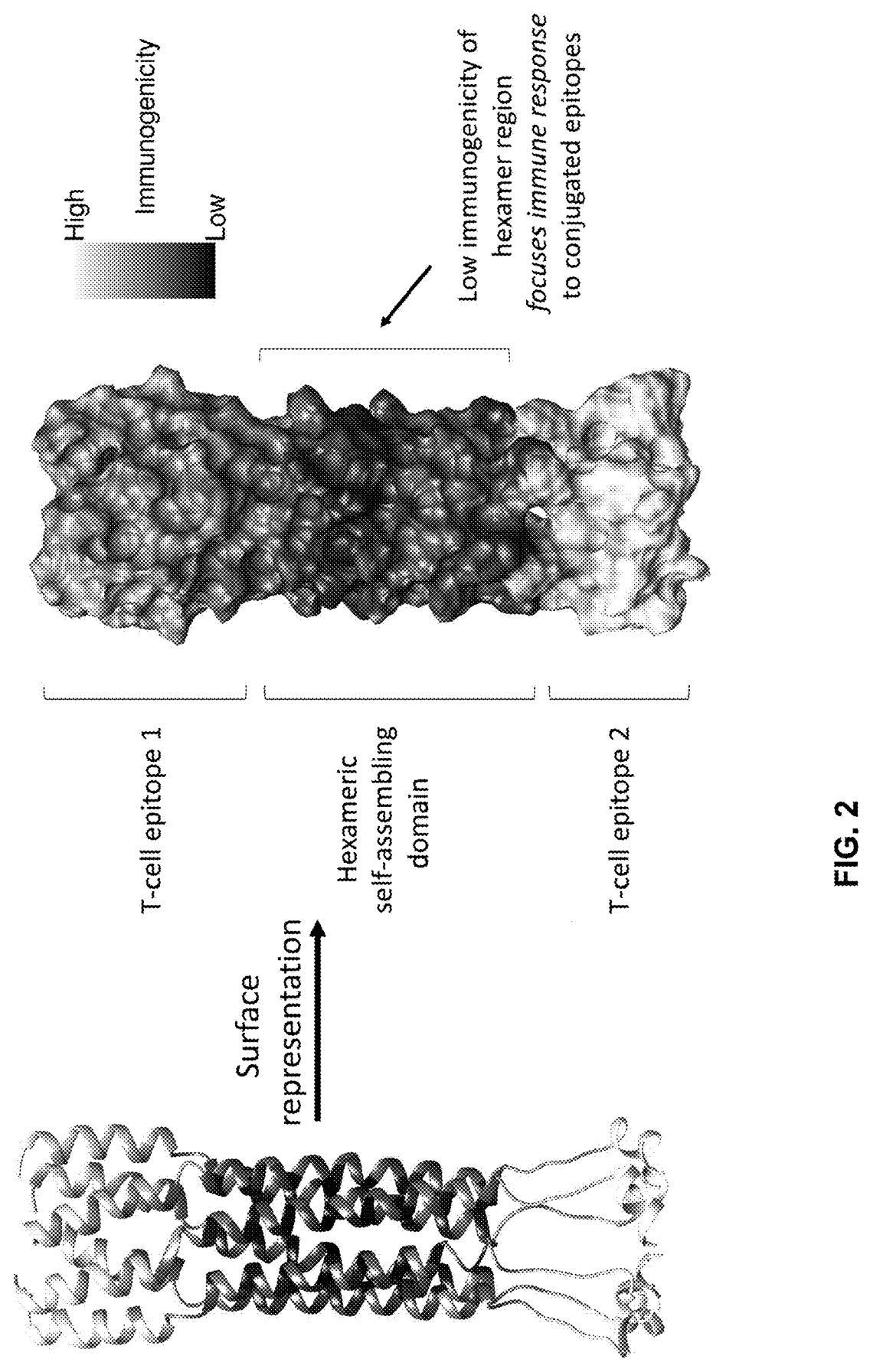

FIG. 2 shows the immunogenicity of the HhC. The three domains of the scaffold are shown in both a ribbon diagram on the left and a surface diagram on the right. The model was analyzed by epitope prediction software and the meta data are colored according to their potential immunogenicity score in the model on the right. Red=higher potential immunogenicity; Blue=lower potential immunogenicity.

DETAILED DESCRIPTION

Haptens are small molecules that lack antigenic determinants due to their small size. In order to become antigenic, they must be coupled to a larger carrier protein to be immunogenic. Small peptides (i.e. usually those less than 5,000 Daltons) also lack antigenic determinants to induce a robust immune response so they too must be coupled to a larger carrier protein to be immunogenic. Therefore, as used herein, "hapten" refers to 1) any molecule that lacks antigenic determinants until it is covalently or non-covalently attached to a larger carrier protein, or 2) a molecule whose antigenicity is increased by covalently or non-covalently coupling to a larger carrier protein.

Figure 1:
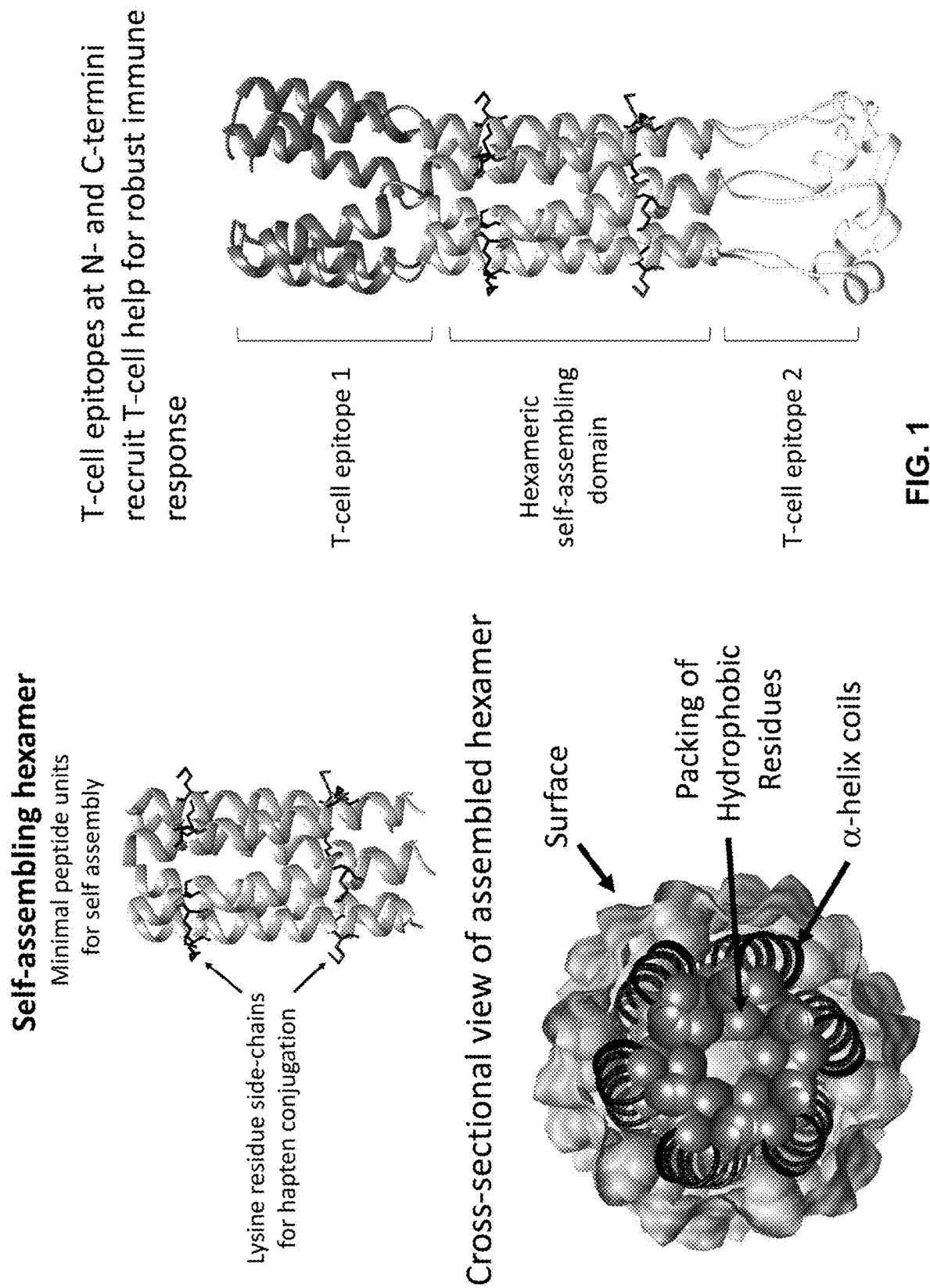
FIG. 1 shows the architecture of the self-assembling hexamer. The hydrophobic residues are on one side of an amphipathic alpha-helix, and the reactive residues (here lysine is shown, but other residues or non-natural amino acids containing reactive groups amenable to covalent coupling) for hapten coupling are on the other side. Upon hydration, the hydrophobic residues associate to exclude water which is the most energetically favorable complex. Placement of species-specific T-cell epitopes are at the N- and C-termini

The present disclosure describes a novel method for producing vaccines including a hapten carrier (hC) containing one or more haptens. The method eliminates many of the costliest and time-consuming steps of traditional subunit vaccine development. Instead of producing subunits in recombinant expression hosts, a flexible and modular system where all the vaccine components are produced synthetically by solid phase peptide synthesis (SPPS). In embodiments, the method described herein includes designing a hC component that self-assembles short peptide amphipathic alpha-helices into a carrier complex large enough to induce a robust immune response after one more haptens are coupled. In embodiments, the hapten carrier includes six peptide amphipathic alpha-helices. As an example, FIG. 1 shows the components of the hexameric hapten carrier (HhC) described herein. There is a central region which forms the core following hydration, and lysines in this region function for conjugating haptens, for example small endogenous peptides or peptides comprising B-cell epitopes on a larger protein. The size of the HhC can vary according to T-cell epitope length. Upon hexamer formation, the unconjugated hexamer is 38.5 kDa (FIG. 1). The conjugated hexamer will be larger depending on the length and size of the conjugated hapten. For example, a 20-residue peptide of 2,156 Daltons loaded onto the hexamer would increase the size from 38.5 kDa to 64 kDa.

The present disclosure also describes the use of the hC as a carrier for agents that need to be delivered in vivo. The agent is conjugated or linked to the hC for delivery to a specific site in vivo.

The present disclosure describes a core region of the hC that includes a peptide of at least 14 amino acid residues long and comprising at least two heptad repeats, each heptad having the pattern hwxhxyz (SEQ ID NO: 19), wherein
 h is a hydrophobic or non-polar residue;
 w is a positively charged, negatively charged, polar uncharged, or non-polar aliphatic residue;
 x is negatively charged, positively charged, non-polar aliphatic, polar uncharged residue, or any natural or non-natural residue for epitope coupling to a hapten or any other molecule;
 y is any natural or non-natural residue for epitope coupling to a hapten or any other molecule; and
 z is a negatively charged, positively charged, polar uncharged, non-polar aliphatic residue, or any natural or non-natural residue for epitope coupling to a hapten or any other molecule.

In embodiments, the hC core region includes a peptide having the pattern (hwxhxyz)n (SEQ ID NO: 20), wherein
 h is I, L, V, F, W, Y, M, W, G, or A;
 w is G, R, A, N, Q, H, S, D, E, K or T;
 x is R, S, N, Q, A, G, T, D, E, K, H, or C;
 y is K, H, C, D, E, R, W, Y, Q, N, or a non-natural amino acid or molecule containing reactive groups amenable to covalent coupling;
 Z is A, D, H, S, E, R, N, Q, K, or G; and
 n is an integer greater than 1

In embodiments, the exemplary heptads described herein have the following amino acid sequences:

```
                                      (SEQ ID NO: 1)
LRSIGKD;

(SEQ ID NO: 2)
LRSIGRD;

(SEQ ID NO: 3)
IREISRA;
```

```
                                      (SEQ ID NO: 4)
IREVAQS;

(SEQ ID NO: 5)
IRDIAKA;

(SEQ ID NO: 6)
IRDIGRA;

(SEQ ID NO: 7)
IRDVGQS;

(SEQ ID NO: 8)
IRDLAKG;

(SEQ ID NO: 9)
VKDVARG;

(SEQ ID NO: 10)
IRDIGNS;

(SEQ ID NO: 11)
IKDLARG;
or (SEQ ID NO: 12)
IKKLKKK.
```

In embodiments, the core region of the hC includes one or more heptads described herein, n is 2, 3, 4, 5, 6, 7, 8, 9, 10, or 11.

The present disclosure describes a core region of the hC that includes a peptide of at least 14 residues. In embodiments, the peptide includes 14 residues to 80 residues in length and includes two to 11 heptad repeats. In embodiments, the hC core region includes a peptide comprising 20 to 70 residues, 25 to 60 residues, 28 to 50 residues, 28 to 40 residues, or 28 to 30 residues. The peptides including 14 residues to 80 residues in length are monomers.

In embodiments, the exemplary peptides described herein have the following amino acid sequences:

```
                                      (SEQ ID NO: 13)
LRSIGKDLRSIGKDLRSIGKDLRSIGKD (SEQ ID NO: 14)
LRSIGKDLRSIGKDLRSIGKDLRSIGKDS;

(SEQ ID NO: 15)
LRSIGKDLRSIGRDLRSIGKDLRSIGRD;

(SEQ ID NO: 16)
IREISRAIREVAQSIRDIAKAIREIGKS;

(SEQ ID NO: 17)
IRDIGRAIRDVGQSIRDLAKGIRDISKG;
or (SEQ ID NO: 18)
VKDVARGIRDIGNSIKDLARGIRDIGRG.
```

The peptides described herein can be modified to include one or more substitutions, insertions, and/or deletions and maintain the pattern of hwxhxyz (SEQ ID NO: 19), described above. The modification at each position within the heptad repeat or the peptide must maintain the amphipathic alpha-helical structure, stability, and oligomerization state of the peptide.

In embodiments, the peptides described herein include peptides that comprise an amino acid sequence having at least 70%, 75%, 80%, 85%, 90%, 95%, 96%, 97%, 98%, 99%, or 100% sequence identity to (SEQ ID NO:1) n, (SEQ ID NO: 2) n, (SEQ ID NO: 3) n (SEQ ID NO: 4) n, (SEQ ID NO: 5) n, (SEQ ID NO: 6) n, (SEQ ID NO: 7) n, (SEQ ID NO: 8) n, (SEQ ID NO: 9) n, (SEQ ID NO: 10) n or SEQ ID NO: 11) n, wherein n is an integer from 2 to 11. In embodiments, the peptides described herein include peptides that comprise an amino acid sequence having at least 70%, 75%, 80%, 85%, 90%, 95%, 96%, 97%, 98%, 99%, or 100% sequence identity to SEQ ID NO: 12, 13, 14, 15, 16, or 17. Sequence identity refers to the degree of correspondence of two sequences in an alignment, often expressed as a percentage. Differences between two sequences may be determined by methods routinely practiced in the art to determine identity, which are designed to give the greatest match between the sequences tested. Methods to determine sequence identity can be determined by using publicly available computer programs. Computer program methods to determine identity between two sequences include, for example, BLASTP, BLASTN, and FASTA. The BLAST family of programs is publicly available from NCBI and other sources.

In embodiments, residues can be added to the N- or C-terminus of the peptides described herein to increase the stability of the peptides in vivo. For example, V (valine), M (methionine), G (glycine), I (isoleucine), D (aspartic acid), or P (proline) can be added to the N- or C-terminus of the peptides. Moreover, protective groups can be added to residues to increase the stability of the peptides. Examples of such protective groups include acetyl, acryl, 9-fluorenylmethoxycarbonyl, tert-butyloxycarbonyl, allyloxycarbonyl, benzyloxycarbonyl, and PEG (polyethyleneglycol).

The peptides (including the modified peptides) described herein can be chemically synthesized by manual techniques or by automated procedures. As an example, solid phase polypeptide synthesis (SPPS) has been performed since the early 1960's. Over the years, improvements to the early SPPS have been made, and many methods have been automated. Chemistries have been developed to protect terminal ends and other reactive groups.

The peptides described herein can also be produced biologically or recombinantly in a heterologous expression system. Any heterologous expression system can be used for producing the peptides described herein. In embodiments, the expression system comprises E. coli., which lacks the machinery for post-translational modification, making it a suitable host for producing the peptides described herein.

The peptides described herein can be a monomeric hapten carrier (hC), but since the peptide is a self-assembling peptide, it can self-assemble into a hC that is an oligomer composed of a dimer, trimer, tetramer, pentamer, hexamer, heptamer, octamer, nanomer, or decamer. In embodiments, the peptide self-assembles into a hexamer, which has six amphipathic alpha-helices.

In embodiments, the present disclosure describes a self-assembling hexamer that is a Hexameric hapten Carrier (HhC) including one or more residues for conjugating a hapten. The optimal site on the HhC for conjugating to hapten is the y residue in the heptad repeat, but hapten coupling could also take place at the w, x, and z residues since they are solvent accessible, and the hapten can be coupled using any residue that can couple an epitope of a hapten. In embodiments, the y residue is K, H, C, D, E, R, W, Y, Q, N, or a non-natural amino acid containing reactive groups amenable to covalent coupling. In embodiments, there are two to four y residues on one side of each of the six amphipathic alpha-helices to provide a coupling site. In embodiments, the y residue is lysine (K).

The hC can be conjugated to one or more haptens using the y residue. The hC conjugated to a hapten is a peptide conjugate and is referred to as the hapten-hC conjugate or hapten-oligomer conjugate. In embodiments, the hC is linked to one to 100, 10 to 90, 20 to 80, 30 to 70, 40 to 60, or 50 haptens. The haptens may be the same or different.

The term "haptens" refers to molecules that are not good immunogens by themselves, but they become immunogenic when attached to a larger molecule. A hapten can be a small organic molecule, a monosaccharide, disaccharide, oligosaccharide, a lipid, nucleic acid, peptide, or a polypeptide, for example. Although a hapten may be capable of binding to an antibody, immunization with a hapten does not usually provoke a strong antibody response. However, immunogenicity can be achieved when the hapten is covalently attached by linking or conjugating to a larger carrier molecule, such as a hapten-carrier conjugate that is greater than 5,000 Daltons. The hapten carriers (hCs) described herein are examples of such hapten-carrier conjugates.

Haptens that can be conjugated to the hC include any agent that can elicit the production of antibodies which are useful for treating, preventing, alleviating the symptoms of, or reducing the risk of developing a disease or disorder, including addiction to a drug, in a subject. Examples of haptens include peptides, lipids, lipopeptides, lipoproteins, carbohydrates, and small molecules. Examples of peptides that can be used as haptens include T-cell epitopes and B-cell epitopes. Peptides, T-cell epitopes, and B-cell epitopes include synthetically or recombinantly produced or native peptides or proteins comprising natural or non-natural D- or L-amino acids. Lipids that can be used as haptens include those that induce an innate and/or adaptive immune response through binding to TLR and MHC I or II receptors. The lipids can also serve as B-cell epitopes. Carbohydrates that can serve as haptens include glucose, disaccharides, trisaccharides, and larger saccharides, including complex carbohydrates.

Haptens can be coupled to the hC using any known method including click chemistry or homo- or heterobifunctional cross-linking reagent or peptide bond formation. In embodiments, haptens can be conjugated to the hC using EDC (1-ethyl-3-(3-dimethylaminopropyl)carbodiimide hydrochloride)/NHS (N-hydroxysuccinimide) or NHS/maleimide cross-linking chemistry, which are routinely used for conjugating molecules. The y residues, for example lysines, are positioned to provide well defined hapten placement and coupling stoichiometry.

Haptens also can be coupled to the hC via any suitable linker moiety. Examples of linkers include those that form amide linkages, ester linkages, and disulfide linkages. The linker can be a cleavable linker such as protease cleavable peptide linker, nuclease sensitive nucleic acid linker, lipase sensitive lipid linker, glycosidase sensitive carbohydrate linker, pH sensitive linker, hypoxia sensitive linker, photocleavable linker, heat-labile linker, or enzyme cleavable linker. The linker can also be a non-cleavable linker. Any known method can be used to associate a linker with the hC, for example, click chemistry, passive adsorption, multivalent chelation, high affinity non-covalent binding, or covalent bond formation. A hapten can also be attached to the hC without a linker.

Additionally, a hapten can be conjugated to the hC through another molecule. For example, a hapten, such as a B-cell epitope or T-cell epitope, can be first coupled to a carrier for displaying an epitope of interest, and then be conjugated to the hC. Examples of such carrier include protein, peptide, nanoparticle, virus-like particle, or anything that can function as a carrier for displaying epitopes of interest.

Moreover, the present disclosure describes a hC optionally including one or more T-cell epitopes linked to the N- and/or C-terminus of one or more of the helices in the core of the hC. In embodiments, one or more T-cell epitopes are linked to the N- and/or C-terminus of each of the helices in the core of the hC. The T-cell epitopes at the N- and/or C-terminus recruit T-cell help to provide a robust immune response from the hapten conjugated hexamer. Methods for selecting a T-cell epitope peptide are well-known. For example, a T-cell epitope can be selected by experimental methods known in the art, identified from the scientific literature, predicted using bioinformatics tools, designed de novo, or a combination of these methods. In embodiments, the T-cell epitopes at the N-terminus and C-terminus are the same or different. In embodiments, the T-cell epitopes are, for example, CD4+ T-cell epitopes, which are known to enhance the development of memory B cells and plasma cells that produce high affinity antibodies.

The T-cell epitopes can be coupled to the N- and/or C-terminus using native chemical ligation (NCL) instead of solid phase synthesis. The T-cell epitopes can be coupled to the N- and/or C terminus using homo or heterobifunctional cross-linkers or using click chemistry reagents, which are well-known reagents for coupling molecules.

The T-cell epitopes at the N- or C-terminus can be linked or conjugated to the hC through either an intermediary functional reagent such as a reactive small molecule or a large molecule. Examples of such small molecule include a catalyst, a stable intermediate, or a salt. Examples of such large molecule include a multiple antigenic peptide, protein or enzyme.

Further, the conjugation of T-cell epitopes at the termini of the hC or the conjugation of haptens or other molecules to the core of the hC can be performed using any kind of linkers. The linkers can be cleavable or uncleavable. Cleavable linkers include protease cleavable peptide linkers, nuclease sensitive nucleic acid linkers, lipase sensitive lipid linkers, glycosidase sensitive carbohydrate linkers, pH sensitive linkers, enzyme cleavable linkers, heat-labile linkers, photo-cleavable linker. Cross-linkers can also be used by activation of a side chain atom or terminal atom for covalent reaction with an intermediary or final molecule atom to form a covalent bond.

Agents other than haptens can be conjugated to hC for delivery in vivo. The term "agents" includes molecules, such as nucleic acids, peptides, and therapeutic agents. For example, nucleic acids or derivatives of nucleic acids can also be conjugated to the hC through covalent bonds for delivery to the interior of a cell or cellular organelles. A T-cell epitope can be conjugated, for example, with a cleavable spacer or linker which can be cleaved in vivo. Once cleaved, the T-cell epitope can be presented through binding to the major histocompatibility complex (MHC) to trigger T-cell immune response. Example of therapeutic agents include small molecules such as paclitaxel and doxorubicin for cancer treatment.

One or more of the agents described herein can be conjugated or linked to the hC at one or more of the N- and/or C-terminus or at the core of the hC through the y residue using any of the methods known and described herein for linking a hapten to the hC. The resulting agent-hC conjugate does not include a T-cell epitope. As an example, a therapeutic agent can be linked or conjugated to the hC through a cleavable or uncleavable cross-linker for delivery to a specific site.

In embodiments, the agent-hC conjugate including a therapeutic agent can further include one or more targeting agents (replacing the T-cell epitopes) for targeting specific sites. The specific sites can extracellular or intracellular sites, such as subcellular organelles. Examples of subcellular organelles include mitochondria, peroxisomes, nuclei, cytosol, ER, or golgi complex.

In embodiments, the targeting agent is a cell penetrating peptide (CPP). Examples of CPPs include TAT (derived from a HIV protein), Penetratin (pAntp (4358)), Rn, and pVEC. These are cationic CPPs. Other examples of CPPs include amphipathic CPPs which are chimeric peptides. These chimeric peptides include a hydrophobic domain and a nuclear localization signal (NLS). Examples of such chimeric peptides include MPG and Pep-1.

The present disclosure describes compositions including the hC described herein and one or more excipients. In embodiments, the hC is conjugated to one or more haptens (hapten-hC conjugate) or agents (agent-hC conjugate) and optionally one or more T-cell epitopes is linked at (or conjugated to) the N- and/or C terminus of the core of the hC. In embodiments, the composition is a pharmaceutical composition and the excipient is a pharmaceutically acceptable excipient. In embodiments, the hC is HhC.

The term "excipient" refers to a diluent, adjuvant, or vehicle with which the hC is administered. Examples of adjuvants include complete and incomplete Freund's adjuvant, which are used with animals, particularly research animals. Pharmaceutically acceptable excipients can be sterile liquids, such as water and oils, including those of petroleum, animal, vegetable or synthetic origin, such as peanut oil, soybean oil, mineral oil, sesame oil and the like. Water is a preferred excipient when the pharmaceutical composition is administered intravenously. Saline solutions and aqueous dextrose and glycerol solutions can also be employed as liquid excipients, particularly for injectable solutions. Suitable pharmaceutical excipients include starch, glucose, lactose, sucrose, gelatin, malt, rice, flour, chalk, silica gel, sodium stearate, glycerol monostearate, talc, sodium chloride, dried skim milk, glycerol, propylene, glycol, water, ethanol and the like. Pharmaceutically acceptable adjuvants include those that are based on monophosphoryl lipid-A mixed with an oil, for example, squalene.

The composition or pharmaceutical composition, if desired, can also contain minor amounts of wetting or emulsifying agents, or pH buffering agents. These compositions can take the form of solutions, suspensions, emulsion, tablets, pills, capsules, powders, sustained-release formulations and the like. Oral formulation can include standard excipients such as pharmaceutical grades of mannitol, lactose, starch, magnesium stearate, sodium saccharine, cellulose, magnesium carbonate, etc. Such formulation will contain a therapeutically effective amount of the hC, in purified form, together with a suitable amount of excipient to provide the form for proper administration to the subject. The formulation should suit the mode of administration.

The administration of the pharmaceutical compositions described herein may be carried out in any convenient manner, including by aerosol inhalation, injection, ingestion, transfusion, implantation or transplantation. The compositions described herein also can be administered to a subject orally, topically, intranasally, enterally, rectally, buccally, vaginally, sublingually, subcutaneously, intradermally, intratumorally, intranodally, intramedullary, intramuscularly, intravenously, intracranially, intraperitoneally, or a combination thereof. The administration of the pharmaceutical composition can be in any manner that is effective to deliver a therapeutically and/or prophylactically effective amount of the hapten-hC or agent-hC conjugate to the subject in need thereof.

The present disclosure describes a peptide scaffold useful for producing vaccine. The present disclosure also describes a method of preparing a vaccine which includes designing and preparing a monomeric peptide for the core of the hC described herein, allowing the monomeric peptide to oligomerize, and conjugating a hapten of interest to the oligomerized hC. As described above, the monomeric peptide can be synthesized by SPPS which includes providing the prepared monomeric peptide in lyophilized form. Hydration of the lyophilized monomeric peptide allows oligomerization to take place. PBS, which includes salt and buffering capability, can be used to hydrate the lyophilized monomeric peptide. In embodiments, the oligomerized hC is a HhC. The method can further include linking one or more T-cell epitopes to the N- or C-terminus of the one or more helices of the core of hC. In embodiments, the monomeric peptide is synthesized with one or more T-cell epitopes attached to its N- and/or C-terminus.

Further, the methods described herein include increasing the immunogenicity of a hapten. The method includes conjugating a hapten of interest to the hC described herein. The method can further include linking one or more T-cell epitopes to the N- or C-terminus of the one or more helices of the core of hC. The increase in immunogenicity of the hapten is compared with the immunogenicity of the hapten by itself, for example, not linked to or associated with an excipient.

In embodiments, the present disclosure describes immunogenic compositions comprising the hapten-hC conjugate as described above. The hapten-hC conjugate optionally includes one or more T-cell epitopes. The immunogenic composition includes one or more pharmaceutically acceptable excipients. The excipient may be an adjuvant which is used to improve or enhance the immune response to the hapten-hC conjugate in a therapeutically effective manner. The immunogenic composition can be administered to a subject in need thereof by any route described herein for delivering a pharmaceutical composition in an effective amount to a subject in need thereof.

The dosage for administering the pharmaceutical and immunogenic compositions described herein to a subject will vary with the precise nature of the condition being treated and the recipient of the treatment. The scaling of dosages for human administration can be performed according to art-accepted practices by a physician depending on various factors.

The pharmaceutical or immunogenic composition described herein can be a formulation. In embodiments, the pharmaceutical or immunogenic composition can be formulated for immediate release or for sustained or slow release. Such formulations can be prepared using well known technology. Sustained release formulations can contain the hapten-hC or agent-hC conjugate dispersed in an excipient matrix and/or contained within a reservoir surrounded by a rate controlling membrane. Excipients for use within such formulations are biocompatible and/or biodegradable. The formulation provides a relatively constant level of active component release. The amount of hapten-hC or agent-hC conjugate contained within a sustained release formulation depends upon the site of implantation, the rate and expected duration of release, and the nature of the condition to be treated or prevented.

The present disclosure also describes kits with unit doses of hapten-hC or agent-hC conjugate described herein. Such kits may include a container containing the unit dose, an informational package insert with instructions for using the kit to treat or prevent a disease or disorder of interest, and optionally an appliance or device for delivery of the composition.

The methods described herein include treating subjects such as humans, veterinary animals (dogs, cats, reptiles, birds, etc.), livestock (horses, cattle, goats, pigs, chickens, etc.), and research animals (monkeys, rats, mice, fish, etc.). Subjects in need of a treatment (in need thereof) are subjects having disease or disorders that need to be treated with a vaccine or immunogenic composition that will induce an immune response in the subject that is sufficient or therapeutically effective to treat the subject of the disease or disorder. The term "disease" or "disorder" also includes drugs of abuse such as nicotine, heroin, cocaine, methamphetamines, etc.

The methods described herein also include prophylactic treatment of a subject need thereof. The methods described herein protects a subject from a disease or disorder by inducing an immune response in the subject that is sufficient or therapeutically effective to protect the subject from the disease or disorder.

The treatments include administering an effective amount of the hapten-hC or agent-hC conjugate or the composition including the hapten-hC or agent-hC conjugate in an effective amount. An "effective amount" is the amount of active agent, for example hapten-hC or agent-hC or composition described herein, necessary to result in a desired physiological change in vivo or in vitro. A therapeutically effective amount includes those that provide an effective amount.

An efficacious vaccine contains components able to induce both innate and adaptive immune responses following immunization. Whereas innate immunity is induced using adjuvants, in embodiments, the hC described herein is a HhC that contains the adaptive B- and T-cell epitopes as shown in FIG. 1. After epitope conjugation, the hexamer-epitope conjugate contains minimal extraneous sequences for a more focused and robust immune response against the B-cell epitopes. In embodiments, for CD4+ T-cell activation, the N- and C-termini of each of the six helices and/or the core of the HhC contain species-specific CD4+ T-cell epitopes required for recruiting T-cell help, producing long-lived plasma cells and high titer/high affinity antibodies, and directing a robust immune memory response. These epitopes are placed at the termini of the HhC, so that they do not interfere with hapten coupling. They are chosen to lack lysine and cysteine residues so that they are not haptenized or uncontrollably cross-linked during the B-cell epitope coupling process. It has been shown that lysine haptenization in T-cell epitopes greatly reduces their activity and function. T-cell epitopes from many different species can be acquired from the IEDB database and are chosen based on positive T- and B-cell assays including MHC ligand binding assays, ability to recruit T-cell help, and induction of B-cell proliferation. The modular nature of the vaccine technology described herein simplifies transferring vaccine constructs between species, as it is a simple matter of replacing the T-cell epitopes and modifying the B-cell epitope if a different disease or condition is targeted.

A distinct advantage of the HhC core region described herein is its reduced immunogenicity (FIG. 2), which minimizes the presentation of unproductive or non-protective immunodominant epitopes. Thus, the combination of presenting multiple B-cell epitopes with a reduction of nonproductive immunodominant epitopes, and the presentation of multiple T-cell epitopes, produces a highly efficacious vaccine.

Haptens, such as B-cell epitopes comprising short peptides (8-10 residues), medium length peptides (10-40 residues), synthetic long peptides (SLPs, 40-100 residues), or peptides or proteins can be designed using a reverse vaccinology approach to initially identify haptens producing antibodies that bind to the target and inhibit function. For example, binding of an antibody to an abundant viral envelope glycoprotein has the potential to interfere with the virus binding to host cell surface receptors, thereby disrupting viral entry into the cell. Analogously, binding of antibodies to abundant pathogenic bacterial surface proteins (e.g. the extracellular portion of outer membrane proteins) could inhibit function or inhibit binding to host cell surface receptors and prevent cellular entry. Known cancer antigenic proteins or those proteins whose antigenicity needs to be enhanced (such as those recognized as "self" by the immune system) are another example of peptides/proteins that could be covalently coupled to the HhC. Once candidate peptide or proteins are identified, they are analyzed in silico to identify linear epitopes. Conformational epitopes are identified by three-dimensional structural analysis, homology modelling, and structural epitope prediction software. Many publicly available web- and server-based software programs are available to perform these analyses and we also have several stand-alone programs to fine-tune epitope identification and analyses. A reverse vaccinology approach has been reported to be successful using the trimeric coiled-coil scaffold for several epitopes including small molecule haptens. The same methodology is used to identify continuous and conformational epitopes on functionally relevant cell surface proteins, cytoplasmic proteins, or secreted factors of an infectious agent, to design a vaccine capable of not only inducing high titer/high affinity antibodies but producing antibodies capable of neutralizing, reducing, or eliminating the antigen from the hosts.

The advantages of using a completely synthetic vaccine scaffold are numerous. Modern SPPS routinely produces peptides up to 70-75 residues in length. The HhC described herein will range in size from 55 to 65 residues with the length of the T-cell epitopes defining how much longer than the 28-30 residue core region the HhC will be. Peptide epitopes to covalently couple to the HhC will vary in size but is optimally 10-50 residues long, making total synthetic construction of the vaccine feasible. Producing kilogram quantities of vaccine peptides in cGMP facilities eliminates costly, time consuming, and resource intensive industrial production and purification of recombinant proteins and there is no need for subsequent viral clearance, endotoxin removal, or testing for the presence of infectious agents. It is usually perceived that peptide synthesis is too costly for large scale vaccine manufacturing. However, if high nanogram to low μg doses can be used, peptide vaccines can be several-fold more cost effective than recombinant subunit vaccines.

The agent-hC conjugate including one or more CPPs can transport and deliver the agent to the target site. The present disclosure also describes a method of preparing an agent for delivery to a target site and a method of delivering an agent to a target site. The method of preparing an agent for delivery to a target site includes preparing a delivery vehicle for delivering an agent to a target site, which include preparing a peptide described herein, allowing the peptide to self-assemble into an oligomer, and conjugating the agent to the oligomer. The method further includes conjugating a CPP to the peptide before self-assembly into an oligomer or conjugating the CPP to the oligomer. The method of delivering the agent to a target site include delivering the agent-hC conjugate to the target site in vivo in a subject in need thereof and in vitro to cells in culture.

The terms "residue" and "amino acid residue" are used interchangeably throughout the disclosure to refer to "amino acid."

As will be understood by one of ordinary skill in the art, each embodiment disclosed herein can comprise, consist essentially of, or consist of its particularly stated element, step, ingredient or component. Thus, the terms "include" or "including" should be interpreted to recite: "comprise, consist of, or consist essentially of." The transition term "comprise" or "comprises" means includes, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the embodiment to the specified elements, steps, ingredients or components and to those that do not materially affect the embodiment. In embodiments, lack of a material effect is evidenced by lack of a statistically-significant reduction in the embodiment's ability to perform a function in vitro or in vivo.

In addition, unless otherwise indicated, numbers expressing quantities of ingredients, constituents, reaction conditions and so forth used in the specification and claims are to be understood as being modified by the term "about." Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

When further clarity is required, the term "about" has the meaning reasonably ascribed to it by a person skilled in the art when used in conjunction with a stated numerical value or range, i.e. denoting somewhat more or somewhat less than the stated value or range, to within a range of ±20% of the stated value; ±15% of the stated value; ±10% of the stated value; ±5% of the stated value; ±4% of the stated value; ±3% of the stated value; ±2% of the stated value; ±1% of the stated value; or ±any percentage between 1% and 20% of the stated value.

The terms "a," "an," "the" and similar referents used in the context of describing the invention (especially in the context of the following claims) are to be construed to cover both the singular and the plural, unless otherwise indicated herein or clearly contradicted by context.

Recitation of ranges of values herein is merely intended to serve as a shorthand method of referring individually to each separate value falling within the range. Unless otherwise indicated herein, each individual value is incorporated into the specification as if it were individually recited herein. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

All methods described herein can be performed in any suitable order unless otherwise indicated herein or otherwise clearly contradicted by context.

The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

The following examples illustrate exemplary methods provided herein. These examples are not intended, nor are they to be construed, as limiting the scope of the disclosure. It will be clear that the methods can be practiced otherwise than as particularly described herein. Numerous modifications and variations are possible in view of the teachings herein and, therefore, are within the scope of the disclosure.

EXAMPLES

Example 1. Synthesis of the Self-Assembling Hapten Carrier (hC)

The HhC core region is at least 28-30 residues long and contain 2-10 heptad repeats with the general pattern hwxhxyz (SEQ ID NO: 19) where h is hydrophobic or non-polar residue (for example, I, L, V, F, W, Y, G, A, or M); w is positively charged, negatively charged, polar uncharged, or non-polar aliphatic residue (for example, G, R, A, N, Q, H, S, D, K, T, or E); x is negatively charged, positively charged, non-polar aliphatic, or polar uncharged residue (for example, R, S, N, Q, A, G, T, D, E, K, H, or C); y is residue where epitope coupling occurs (for example, K, H, C, D, E, R, W, Y, Q, or N); and z is negatively charged, positively charged, polar uncharged, or non-polar aliphatic residue (for example, A, D, H, S, E, R, N, Q, K, or G). Basic and acidic residues at the w and z positions are designed so that a salt bridge or hydrogen bonding interactions occur between adjacent helices to increase stability of the complex.

Correct assembly of the hexamer is confirmed using gel filtration chromatography and/or native PAGE. These analyses show the extent to which higher order structures form. Circular dichroism is used to confirm that the hexamer core region comprises alpha-helices. The alpha helical nature of the hexamer at different temperatures and chaotrope concentrations is determined to define stability and to ensure that lysines are solvent exposed for conjugation reactions.

CD spectra of the hexamer are acquired at temperatures from 22° C. to 95° C. and at guanidine HCl concentrations from 0 to 6M for defining the folding/unfolding equilibrium of the monomeric peptide as well as the stability of the hexamer as a function of temperature and denaturing reagents, both of which are important factors in characterizing the stability of a peptide-based vaccine.

Figure 4:
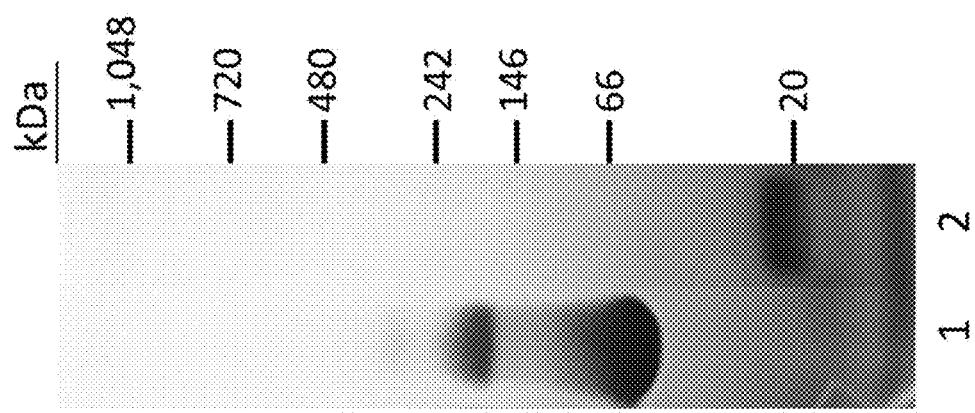
FIG. 4 shows PAGE gel of a self-assembled peptide. The peptide (SEQ ID NO: 15) was synthesized by SPPS and lyophilized for storage. The peptide was dissolved in 1×PBS and then loaded onto a blue native PAGE gel and size fractionated by electrophoresis through a 4-16% acrylamide gradient gel for 90 min at 150 V (constant). The gel was fixed in methanol:acetic acid:water and then rinsed in the same solution to destain. Lane 1 is BSA as a reference protein, and Lane 2 is the self-assembled hexamer. MW standards (which are not shown) are on the right. BSA is 66 kDa and the hexamer has an expected size of 20.7 kDa.

Experiments were performed to confirm that a hexamer forms following hydration of the monomer, elucidate the solubility of epitope coupled hexamers, determine the maximum density of epitope coupling, and confirm that a hexameric structure is maintained following coupling of the epitope. A representative peptide, SEQ ID NO: 15, was synthesized using the protocols previously described. A methionine and aspartic acid residue were placed on the N-terminus, and the methionine residue was protected by acetylation to form Acetyl-MD-(SEQ ID NO: 15). Following SPPS, the peptide was lyophilized for storage. To show self-assembly, the peptide was dissolved in 1×PBS buffer, incubated at room temperature for 5 min, and loaded onto a Blue NativePAGE Novex Bis-Tris Gel using the system purchased from Life Technologies. Samples were prepped and electrophoresed using the manufacturer's protocols. FIG. 4 shows the results of this experiment. The size of the non-assembled peptide is 3.443 kDa, so the expected size of a hexamer is 20.7 kDa. This experiment clearly shows self-assembly of the hexamer and shows no detectable higher order structures or aggregates. Thus, we have shown utility of our in silico design protocols followed by experimental analyses to confirm function.

To assist with identifying B-cell epitope sequences, the amino acid sequence of the full-length antigenic proteins is used for homology modelling and conformational B-cell epitope identification. Obtaining a homology model allows for searching conformational B-cell epitopes which usually produce more robust antigenic peptide sequences. Servers on the IEDB website (www.iedb.org) are used for both continuous and conformational epitope prediction. Currently, there are only a handful of web servers able to analyze the 3D structure of proteins for epitopes. ElliPro and Discotope on the IEDB site are used as an initial screening. A third stand-alone program called PTools, which predicts epitopes based on the electrostatic desolvation potential on protein surfaces is subsequently used for conformation. These software programs have proven especially accurate for predicting epitopes on the trimeric coiled-coil hapten carrier. Once the most antigenic regions are identified on the protein, peptide sequences are identified and analyzed for solubility. Because peptide sequences 20 residues or longer tend to form a discernible tertiary structure, epitopes are selected that are at least 10 residues long, but less than 40. Longer peptides encourage native folding and have the greatest potential of presenting structural epitopes to the immune system. Peptides are synthesized and protected on the N-terminus (e.g. acetylated) and have a C-terminal residue amenable for covalent coupling, such as cysteine. Lysine residues on the hexameric hapten carrier are derivatized with a heterobifunctional cross linker Sulfo-SIAB (sulfosuccinimidyl(4-iodoacetyl)aminobenzoate) followed by addition of the peptide containing the C-terminal cysteine residue. Cysteine sulfhydryls are reduced by adding tris(2-carboxyethyl)phosphine to the reaction. The distinct advantage of derivatizing lysines with a sulfhydryl reactive group (iodoacetyl) is that it prevents hexamers cross linking to each other (the hexamers contain no cysteine residues).

Example 2. Constructing Vaccines by Hexamer-Epitope Conjugation

There are up to 24 coupling sites on each hexameric carrier for hapten conjugation (FIG. 1), but due to steric hindrance, it is unlikely that conjugation will occur on all sites. It has been previously shown that saturating the carrier with haptens does not always produce the most robust immune response and there is a trade-off between coupling density, epitope spatial/steric availability for correct B-cell epitope presentation, and antibody titer. Therefore, for each epitope selected, three separate hexamer conjugation reactions are performed to obtain conjugates with different epitope loading levels. For example, one reaction is performed with 3-5 molar equivalents so that only 3 or 4 peptides are conjugated, another reaction contains 8 to 10 molar equivalents to form a conjugate with 6-10 peptides, and the third reaction is performed using 25-50 molar equivalents to couple as many epitopes as possible (saturating conditions).

Figure 3:
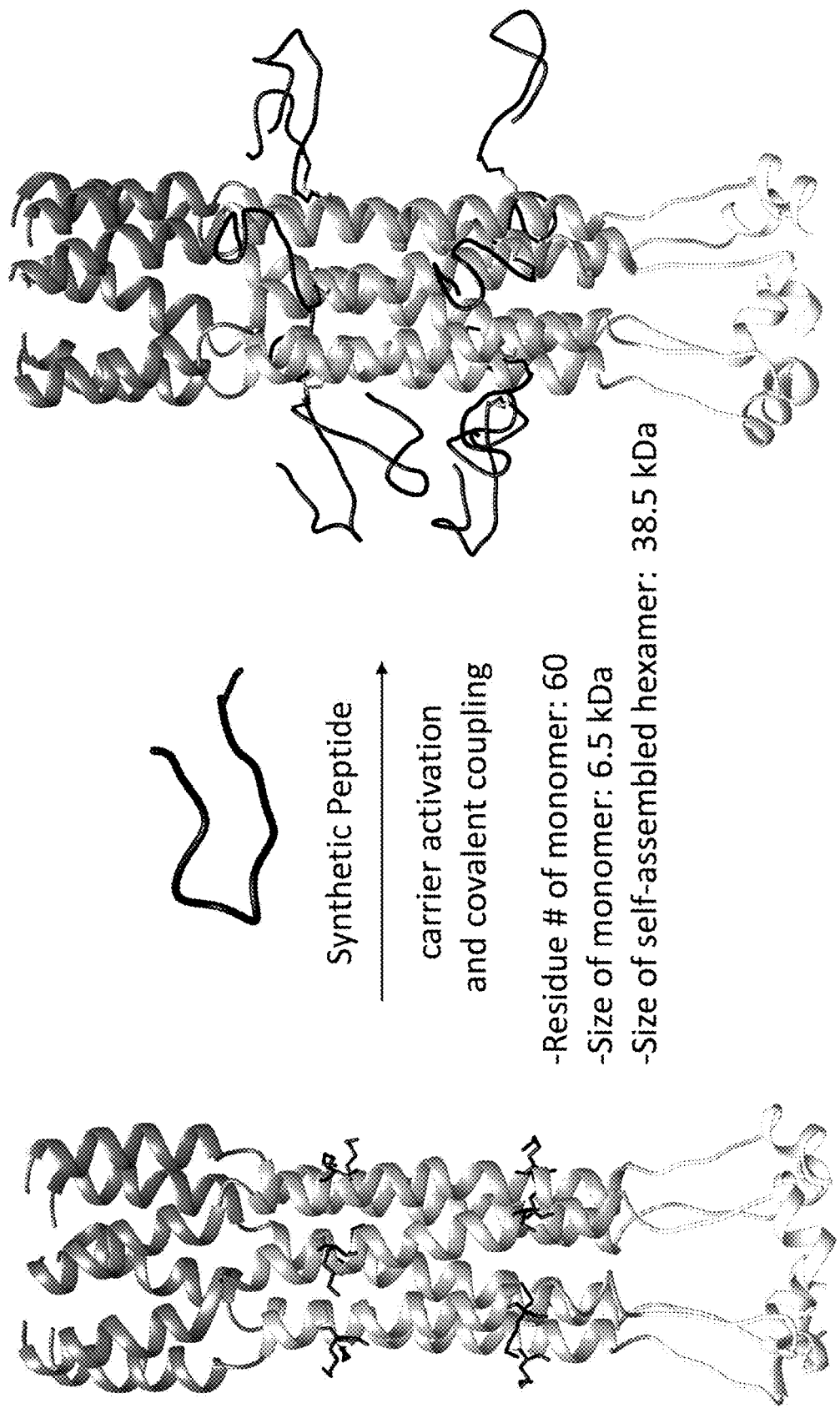
FIG. 3 shows synthesis of the hapten conjugated HhC. The reactive residues on HhC (shown as red bonds) are activated with a residue specific heterobifunctional cross linker or react directly with the activated haptenic peptide (e.g. EDC/NHS esterification) to form the hapten-conjugated hexamer. This reaction is performed with a large excess (>10 molar equivalents) of cross linker and peptide to ensure the hexamer is fully loaded (12 coupled peptides are shown here). A naturally occurring tryptophan, or one added during SPPS, allows coupling efficiency quantitation by fluorescence spectroscopy. Here the size of the monomer is 60 residues.

FIG. 3 illustrates the peptide conjugation procedure. The peptides are designed so the N-terminal residue is acetylated to protect the N-terminal amine from derivatization with cross-linkers. The C-terminus has added residues to modulate the pI, if necessary (e.g. to regulate the isoelectric point), to add a residue for fluorescence-based peptide quantitation (W), and to add a sulfhydryl group for conjugation specificity (C). The pI of the hexameric carrier is 10.1 so the coupling efficiency of peptides with a high pI (e.g. >8.5) will likely be reduced due to charge repulsion. One or more acidic residues is added to the C-terminus to reduce the pI of basic peptides until it has a net negative charge and be attracted to the hexamer. If the pI of the peptide is acidic or neutral, then G or S residues replace the D residues and act solely as a spacer.

Tryptophan fluorescence, gel filtration chromatography, native PAGE, and SELDI-TOF (a MALDI-like MS instrument ideally suited for determining the molecular weight of protein-peptide conjugates) are methods we use to quantify peptide epitope coupling efficiency. It is relatively straightforward to calculate the number of peptides conjugated to the hexameric carrier and to BSA. Because KLH is so large it may only be possible to confirm successful conjugation without calculating the exact number of peptides conjugated.

Characterizing HhC Vaccine Constructs

Adjuvants: To enhance adaptive B- and T-cell responses, regulate the extent of protective immunity, and maximize antigen-specific antibody responses, adjuvants are used for all immunizations. The best adjuvants directly stimulate dendritic cell maturation and the most effective way to guide this is through TLR-mediated activation. Synthetic TLR4 based adjuvants are some of the most effective, so at least two of these are tested. Monophosphoryl Lipid A (MPL) is a potent TLR4 agonist (Persing et al. 2002; Evans et al. 2003; Singh and Srivastava 2003; Pfaar et al. 2012; Del Giudice et al. 2018) that will function as our primary adjuvant. MPL is emulsified with squalene (Sq) (Ciabattini et al. 2018; Seydoux et al. 2018) to form MPL-Sq. Emulsions efficiently prime CD4 T-cells, which are important for inducing both memory and long-lived antibody responses. We will also test the adjuvants E6020 and GLA, both of which are approved for use in humans. All adjuvants will assist with CD4+ induced antigen uptake into dendritic cells and induce epitope specific Th1 CD4+ T cells. To assess adjuvant function, both CD4+ T cell and IgG isotype class switching is quantified in immunized mouse sera. Another important benefit of adjuvants is the high likelihood of antigen dose-sparing which is something that will also be tested. Dose-sparing will decrease the amount of antigen per immunization and increase the number of doses that can be obtained from a synthetic peptide batch and is a key determinant in reducing synthetic vaccine manufacturing costs.

For each hexamer epitope conjugate, at least three sets of experiments are performed. Mice receive a prime-boost immunization (IM) and B- and T-cell function is measured at the indicated times. In the first experiment, three dose levels of vaccine are compared to determine at which level maximum titers are obtained. The hexamer is maximally loaded with peptide epitopes and formulated with MPL-Sq adjuvant prior to immunization. Three dose levels at 0.1, 1, and 10 µg are tested and optimized depending on the IgG titers. This experiment also tests specificity of the hexamer-epitope conjugate by measuring IgG response to the hexamer alone, the peptide epitope alone, and the hexamer+ peptide epitope (unconjugated but combined).

Mouse immunizations: Inbred mice (10/grp) receive a prime/boost immunization with the adjuvanted hexamer-peptide epitope conjugate or control (KLH-peptide epitope). The first set of studies provides the optimal hexameric peptide epitope dose and measure antibody titer against the unconjugated hexamer carrier and the free peptide to confirm specificity. Sera are collected 14 days after both the prime and boost (d35) immunizations and antibody mid-point titers are measured. Mouse blood is used for performing B- and T-cell assays.

B-cell function: Standard ELISA is used to measure vaccine efficacy by measuring antigen specific antibody titer in the collected mouse sera. ELISA plates are coated with the peptide epitope-BSA conjugates and 8 sequential 10-fold dilutions (from 1:103 to 1:1010) of sera in blocking buffer are made and added to the ELISA plate wells. An HRP-labeled anti-mouse secondary antibody is added and the plates developed with a colorimetric substrate and measured in an ELISA plate reader. Data are plotted, curve fitted, and statistically analyzed using Prism Graph Pad software for calculating mid- and end-point titers.

T-cell function: T-cell epitope and adjuvant functions are measured by well-established T-cell ELISA assays. Commercially available coating reagent and primary/secondary antibodies are purchased and used according to the manufacturer's protocols. IFN-γ, IL-2, IL-4, and TNF-α are quantified in mouse sera as read outs of T-cell function. These targets could easily be expanded to include other markers of T-cell function including IL-5, IL-8, IL-10, IL-12p70, and IL-13. Vaccine induced T-cell dependent isotype class switching are assayed by ELISA using reagents specific for total IgG, IgG1, and IgG2a Vaccine safety: Initial assessments of safety are performed in a non-GLP setting to ensure mice have no adverse reactions to vaccine components (synthetic peptides, hexamer carrier, adjuvants). A more precise and detailed safety study are performed later in a GLP study, but this initial evaluation provides some important read-outs to guide vaccine dose, adjuvant dose, and immunization scheduling. Potential local and systemic toxicities are evaluated by observing injection site reactions and signs of inflammation as well as mouse behavior (e.g. signs of lethargy). If toxicity is observed, different adjuvant and/or T-cell epitopes are evaluated.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

All publications, patents and patent applications cited in this specification are incorporated herein by reference in their entireties as if each individual publication, patent or patent application were specifically and individually indicated to be incorporated by reference. While the foregoing has been described in terms of various embodiments, the skilled artisan will appreciate that various modifications, substitutions, omissions, and changes may be made without departing from the spirit thereof.

REFERENCES

Betakova, T., D. Svetlikova and M. Gocnik, 2013 Overview of measles and mumps vaccine: origin, present, and future of vaccine production. Acta Virol 57:91-96.

Bill, R. M., 2015 Recombinant protein subunit vaccine synthesis in microbes: a role for yeast? J Pharm Pharmacol 67:319-328.

Buckland, B. C., 2015 The development and manufacture of influenza vaccines. Hum Vaccin Immunother 11:1357-1360.

Butler, M., and M. Spearman, 2014 The choice of mammalian cell host and possibilities for glycosylation engineering. Curr Opin Biotechnol 30:107-112.

Chou, M. L., A. Bailey, T. Avory, J. Tanimoto and T. Burnouf, 2015 Removal of transmissible spongiform encephalopathy prion from large volumes of cell culture media supplemented with fetal bovine serum by using hollow fiber anion-exchange membrane chromatography. PLOS One 10: e0122300.

Ciabattini, A., E. Pettini, F. Fiorino, S. Lucchesi, G. Pastore et al., 2018 Heterologous Prime-Boost Combinations Highlight the Crucial Role of Adjuvant in Priming the Immune System. Front Immunol 9:380.

Clark, T. G., and D. Cassidy-Hanley, 2005 Recombinant subunit vaccines: potentials and constraints. Dev Biol (Basel) 121:153-163.

Corradin, G., N. Cespedes, A. Verdini, A. V. Kajava, M. Arevalo-Herrera et al., 2012 Malaria vaccine development using synthetic peptides as a technical platform. Adv Immunol 114:107-149.

Corradin, G., A. V. Kajava and A. Verdini, 2010 Long synthetic peptides for the production of vaccines and drugs: a technological platform coming of age. Sci Transl Med 2: 50rv53.

Del Giudice, G., R. Rappuoli and A. M. Didierlaurent, 2018 Correlates of adjuvanticity: A review on adjuvants in licensed vaccines. Semin Immunol.

Evans, J. T., C. W. Cluff, D. A. Johnson, M. J. Lacy, D. H. Persing et al., 2003 Enhancement of antigen-specific immunity via the TLR4 ligands MPL adjuvant and Ribi.529. Expert Rev Vaccines 2:219-229.

Fiorucci, S., and M. Zacharias, 2010 Prediction of protein-protein interaction sites using electrostatic desolvation profiles. Biophys J 98:1921-1930.

Fiorucci, S., and M. Zacharias, 2014 Computational antigenic epitope prediction by calculating electrostatic desolvation penalties of protein surfaces. Methods Mol Biol 1184:365-374.

Genzel, Y., 2015 Designing cell lines for viral vaccine production: Where do we stand? Biotechnol J 10:728-740.

Grein, T. A., R. Michalsky and P. Czermak, 2014 Virus separation using membranes. Methods Mol Biol 1104: 459-491.

Haste Andersen, P., M. Nielsen and O. Lund, 2006 Prediction of residues in discontinuous B-cell epitopes using protein 3D structures. Protein Sci 15:2558-2567.

Hermanson, G. T., 2013a Chapter 2-Functional Targets for Bioconjugation, pp. 127-228 in *Bioconjugate Techniques* (Third Edition), edited by G. T. Hermanson. Academic Press, Boston.

Hermanson, G. T., 2013b Chapter 6-Heterobifunctional Crosslinkers, pp. 299-339 in *Bioconjugate Techniques* (Third Edition), edited by G. T. Hermanson. Academic Press, Boston.

Hu, Y. C., 2005 Baculovirus as a highly efficient expression vector in insect and mammalian cells. Acta Pharmacol Sin 26:405-416.

Hu, Y. C., K. Yao and T. Y. Wu, 2008 Baculovirus as an expression and/or delivery vehicle for vaccine antigens. Expert Rev Vaccines 7:363-371.

Jespersen, M. C., B. Peters, M. Nielsen and P. Marcatili, 2017 BepiPred-2.0: improving sequence-based B-cell epitope prediction using conformational epitopes. Nucleic Acids Res 45: W24-W29.

Josefsberg, J. O., and B. Buckland, 2012 Vaccine process technology. Biotechnol Bioeng 109:1443-1460.

Kawakami, K., and R. K. Puri, 2004 Regulatory expectations during product development for tumour vaccines. Dev Biol (Basel) 116:53-59; discussion 69-76.

Khan, A., S. Datta, S. C. Das, T. Ramamurthy, J. Khanam et al., 2003 Shiga toxin producing *Escherichia coli* infection: current progress & future challenges. Indian J Med Res 118:1-24.

Kim, H. J., and H. J. Kim, 2017 Yeast as an expression system for producing virus-like particles: what factors do we need to consider? Lett Appl Microbiol 64:111-123.

Kost, T. A., and C. W. Kemp, 2016 Fundamentals of Baculovirus Expression and Applications. Adv Exp Med Biol 896:187-197.

Legastelois, I., S. Buffin, I. Peubez, C. Mignon, R. Sodoyer et al., 2017 Non-conventional expression systems for the production of vaccine proteins and immunotherapeutic molecules. Hum Vaccin Immunother 13:947-961.

Miller, K. D., R. Roque and C. H. Clegg, 2014 Novel Anti-Nicotine Vaccine Using a Trimeric Coiled-Coil Hapten Carrier. PLOS One 9: e114366.

Nielsen, J., 2013 Production of biopharmaceutical proteins by yeast: advances through metabolic engineering. Bioengineered 4:207-211.

Olugbile, S., C. Habel, C. Servis, F. Spertini, A. Verdini et al., 2010 Malaria vaccines—The long synthetic peptide approach: Technical and conceptual advancements. Curr Opin Mol Ther 12:64-76.

Perez, S. A., E. von Hofe, N. L. Kallinteris, A. D. Gritzapis, G. E. Peoples et al., 2010 A new era in anticancer peptide vaccines. Cancer 116:2071-2080.

Persing, D. H., R. N. Coler, M. J. Lacy, D. A. Johnson, J. R. Baldridge et al., 2002 Taking toll: lipid A mimetics as adjuvants and immunomodulators. Trends Microbiol 10: S32-37.

Pfaar, O., D. Cazan, L. Klimek, D. Larenas-Linnemann and M. A. Calderon, 2012 Adjuvants for immunotherapy. Curr Opin Allergy Clin Immunol 12:648-657.

Pietersz, G. A., D. S. Pouniotis and V. Apostolopoulos, 2006 Design of peptide-based vaccines for cancer. Curr Med Chem 13:1591-1607.

Ponomarenko, J., H. H. Bui, W. Li, N. Fusseder, P. E. Bourne et al., 2008 ElliPro: a new structure-based tool for the prediction of antibody epitopes. BMC Bioinformatics 9:514.

Roohvand, F., M. Shokri, M. Abdollahpour-Alitappeh and P. Ehsani, 2017 Biomedical applications of yeast—a patent view, part one: yeasts as workhorses for the production of therapeutics and vaccines. Expert Opin Ther Pat 27:929-951.

Rowland, S. S., R. L. Mayner and L. Barker, 2005 Advancing TB vaccines to Phase I clinical trials in the US: regulatory/manufacturing/licensing issues. Tuberculosis (Edinb) 85:39-46.

Safdar, A., and M. M. Cox, 2007 Baculovirus-expressed influenza vaccine. A novel technology for safe and expeditious vaccine production for human use. Expert Opin Investig Drugs 16:927-934.

Sari, D., K. Gupta, D. B. Thimiri Govinda Raj, A. Aubert, P. Drncova et al., 2016 The MultiBac Baculovirus/Insect Cell Expression Vector System for Producing Complex Protein Biologics. Adv Exp Med Biol 896:199-215.

Seydoux, E., H. Liang, N. Dubois Cauwelaert, M. Archer, N. D. Rintala et al., 2018 Effective Combination Adjuvants Engage Both TLR and Inflammasome Pathways To Promote Potent Adaptive Immune Responses. J Immunol 201:98-112.

Singh, M., and I. Srivastava, 2003 Advances in vaccine adjuvants for infectious diseases. Curr HIV Res 1:309-320.

Smith, L. A., M. J. Jensen, V. A. Montgomery, D. R. Brown, S. A. Ahmed et al., 2004 Roads from vaccines to therapies. Mov Disord 19 Suppl 8: S48-52.

Tapia, F., I. Jordan, Y. Genzel and U. Reichl, 2017 Efficient and stable production of Modified Vaccinia Ankara virus in two-stage semi-continuous and in continuous stirred tank cultivation systems. PLOS One 12: e0182553.

Thomson, A. R., C. W. Wood, A. J. Burton, G. J. Bartlett, R. B. Sessions et al., 2014 Computational design of water-soluble alpha-helical barrels. Science 346:485-488.

van Oers, M. M., 2006 Vaccines for viral and parasitic diseases produced with baculovirus vectors. Adv Virus Res 68:193-253.

Vlak, J. M., and R. J. Keus, 1990 Baculovirus expression vector system for production of viral vaccines. Adv Biotechnol Processes 14:91-128.

Warnock, J. N., and M. Al-Rubeai, 2006 Bioreactor systems for the production of biopharmaceuticals from animal cells. Biotechnol Appl Biochem 45:1-12.

Wood, C. W., J. W. Heal, A. R. Thomson, G. J. Bartlett, A. A. Ibarra et al., 2017 ISAMBARD: an open-source computational environment for biomolecular analysis, modelling and design. Bioinformatics 33:3043-3050.

Wood, C. W., and D. N. Woolfson, 2018 CCBuilder 2.0: Powerful and accessible coiled-coil modeling. Protein Sci 27:103-111.

Wu, Y., and J. H. Collier, 2017 alpha-Helical coiled-coil peptide materials for biomedical applications. Wiley Interdiscip Rev Nanomed Nanobiotechnol 9.

Yamada, A., T. Sasada, M. Noguchi and K. Itoh, 2013 Next-generation peptide vaccines for advanced cancer. Cancer Sci 104:15-21.

Zaccai, N. R., B. Chi, A. R. Thomson, A. L. Boyle, G. J. Bartlett et al., 2011 A de novo peptide hexamer with a mutable channel. Nat Chem Biol 7:935-941.

Geysen et al., *J. Immun. Meth.* 102:259-274 (1987)

Miranda et al., *Proc. Natl. Acad. Sci. USA* 96:1181-86 (1999)

Merrifield, *J. Am. Chem. Soc.* 85:2149-2154 (1963))

Altschul, S. F. et al., *J. Mol. Biol.* 215:403-410 (1990)

Pearson and Lipman, *Proc. Natl. Acad. Sci. USA* 85; 2444-2448 (1988)

*BLAST Manual*, Altschul, S., et al., NCBI NLM NIH Bethesda, Md.)

The invention claimed is:

1. A peptide comprising two or more heptads, wherein the heptad has the following amino acid sequence: hwxhxyz (SEQ ID NO: 19; wherein the peptide comprises the following amino acid sequence pattern:
(hwxhxyz)n (SEQ ID NO: 20),
wherein
h is I;
w is R;
x is S or G;
y is K or R;
z is E; and
n is 2 to 4; and
wherein there is at least one K residue in the peptide and K is the only residue used for coupling a hapten.

2. The peptide of claim 1, wherein the peptide further comprises at the N- or C-terminus a V residue, M residue, G residue, I residue, D residue, P residue, acetyl group, acryl group, 9-fluorenylmethoxycarbonyl group, tert-butyloxycarbonyl group, allyloxycarbonyl group, benzyloxycarbonyl group, or PEG (polyethyleneglycol) group.

3. An oligomer comprising the peptide of claim 1, wherein the oligomer is a dimer, trimer, tetramer, pentamer, hexamer, heptamer, octamer, nanomer, or decamer.

4. The oligomer of claim 3, wherein the oligomer is a hexamer.

5. A peptide conjugate comprising the oligomer of claim 3 and one or more haptens or one or more agents.

6. The peptide conjugate of claim 5, wherein the hapten is conjugated to the oligomer through the y residue.

7. The peptide conjugate of claim 6, wherein the hapten comprises a peptide, lipid, lipopeptide, nucleic acid, or carbohydrate.

8. The peptide conjugate of claim 7, wherein the peptide is a T-cell epitope or a B-cell epitope.

9. The peptide conjugate of claim 5, wherein the oligomer further comprises one or more T-cell epitopes at one or more N- or C-terminus of the oligomer's helices.

10. The peptide conjugate of claim 9, wherein the oligomer comprises a T-cell epitope at each of the N- and C-terminus of the oligomer helices.

11. The peptide conjugate of claim 5, wherein the agent is a molecule to be delivered in vivo.

12. The peptide conjugate of claim 11, wherein the agent is a nucleic acid, a peptide, a therapeutic agent, or a T-cell epitope.

13. A composition comprising the peptide conjugate of claim 5, and an excipient.

14. The composition of claim 13, wherein the composition is a pharmaceutical composition and the excipient is a pharmaceutically acceptable excipient.

15. A method of preparing a vaccine, the method comprising,
obtaining a peptide of claim 1, allowing the peptide to self-assemble into an oligomer, and conjugating a hapten to the oligomer.

16. A method of enhancing immunogenicity of a hapten, the method comprising
obtaining a peptide of claim 1,
allowing the peptide to self-assemble into an oligomer, and
conjugating a hapten to the oligomer.

17. A method of preparing a delivery vehicle for delivering an agent to a target site, the method comprising
obtaining a peptide of claim 1,
allowing the peptide to self-assemble into an oligomer, and
conjugating the agent to the oligomer.

18. The method of claim 17, wherein the delivery vehicle further comprises one or more agents that target the delivery vehicle to a specific site.

19. The peptide of claim 1, wherein the peptide comprises the following amino acid sequence pattern:
$(hwx_1hx_2yz)n$ (SEQ ID NO: 20),
and wherein
h is I;
w is R;
$x_1$ is S;
$x_2$ is G;
y is K;
z is E; and
n is 2 to 4.

20. The peptide of claim 1, wherein the peptide comprises the following amino acid sequence pattern:
$(hwx_1hx_2y_1zhwx_1hx_2y_2z)n$ (SEQ ID NO: 20-SEQ ID NO: 20)
and wherein
h is I;
w is R;
$x_1$ is S
$x_2$ is G;
$y_1$ is K;
$y_2$ is R;
z is E; and
n is 1 or 2.

21. The peptide of claim 1, wherein the peptide comprises the following amino acid sequence pattern:

($hwx_1hx_2y_1zhwx_1hx_2y_2zhwx_1hx_2y_2zhwx_1hx_2y_2z$)

(SEQ ID NO: 20-SEQ ID NO: 20-SEQ ID NO: 20-SEQ ID NO: 20)

h is I;
w is R;
$x_1$ is S
$x_2$ is G;
$y_1$ is K;
$y_2$ is R; and
z is E.

22. The peptide of claim 1, wherein the peptide comprises the following amino acid sequence pattern:

($hwx_1hx_2y_1zhwx_1hx_2y_2zhwx_1hx_2y_2z$)

(SEQ ID NO: 20-SEQ ID NO: 20-SEQ ID NO: 20)

h is I;
w is R;
$x_1$ is S
$x_2$ is G;
$y_1$ is K;
$y_2$ is R; and
z is E.

23. The peptide of claim 1, wherein the peptide comprises the following amino acid sequence pattern:

($hwx_1hx_2y_1zhwx_1hx_2y_2zhwx_1hx_2y_2zhwx_1hx_2y_1z$)

(SEQ ID NO: 20-SEQ ID NO: 20-SEQ ID NO: 20-SEQ ID NO: 20)

h is I;
w is R;
$x_1$ is S
$x_2$ is G;
$y_1$ is K;
$y_2$ is R; and
z is E.

* * * * *